(12) United States Patent
Singh et al.

(10) Patent No.: US 12,503,163 B2
(45) Date of Patent: Dec. 23, 2025

(54) CROSS MEMBER, CHASSIS FRAME, VEHICLE, ASSEMBLING, AND DISASSEMBLING METHODS ASSOCIATED

(71) Applicant: Volvo Truck Corporation, Gothenburg (SE)

(72) Inventors: Ranjeet Singh, Madhya Pradesh (IN); Deepak Mysore Ramesh, Karnataka (IN); Goutam Mandal, West Bengal (IN); Amit Kumar, Bihar (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/935,792

(22) Filed: Nov. 4, 2024

(65) Prior Publication Data

US 2025/0145219 A1    May 8, 2025

(30) Foreign Application Priority Data

Nov. 8, 2023 (EP) .................................. 23208629

(51) Int. Cl.
*B62D 21/02*    (2006.01)
(52) U.S. Cl.
CPC .................................. *B62D 21/02* (2013.01)
(58) Field of Classification Search
CPC ........ B62D 21/00; B62D 21/02; B62D 21/08; B62D 21/12; B62D 27/065; B62D 21/03; B60R 19/02; B60R 2019/1806; B60R 2019/1813
See application file for complete search history.

(56) References Cited

U.S. PATENT DOCUMENTS 11,254,367 B2 * 2/2022 Stojkovic ............... B62D 25/08
2013/0153612 A1   6/2013 O'Brien et al.
(Continued)

FOREIGN PATENT DOCUMENTS

CN    109070674 A    12/2018
EP    2308744 A2    4/2011
EP    2336004 A1 *    6/2011    ............. B62D 21/02
(Continued)

OTHER PUBLICATIONS

Shreeharsha, EP 4249351 A1, Machine Translation of Specification (Year: 2023).*

(Continued)

*Primary Examiner* — Paul N Dickson
*Assistant Examiner* — Matthew Joseph Ganci
(74) *Attorney, Agent, or Firm* — Withrow & Terranova, PLLC

(57) ABSTRACT

A cross member for a chassis frame of a vehicle, the cross member comprising a first part and a second part, the first part comprising a first top flange, a first bottom flange parallel to the first top flange, a first web, and a first end surface. The second part comprises a second top flange, a second bottom flange parallel to the second top flange, a second web, and a second end surface parallel to the first end surface. A portion of the first end surface, when in projection in a plane parallel to the first top flange is oblique in relation to a plane perpendicular to a transversal axis. The cross member further comprises a reinforcement member, secured to the first and second webs.

15 Claims, 7 Drawing Sheets

(56) References Cited

U.S. PATENT DOCUMENTS

2022/0111897 A1* 4/2022 Kelk .................... B62D 27/065
2022/0194481 A1* 6/2022 Spehar ................ B62D 27/023

FOREIGN PATENT DOCUMENTS

| EP | 2308744 A3 | 8/2014 | | |
|---|---|---|---|---|
| EP | 4249351 A1 * | 9/2023 | ............. | B62D 21/03 |
| JP | 2020040444 A | 3/2020 | | |
| WO | 2007106913 A2 | 9/2007 | | |
| WO | WO-2023167896 A1 * | 9/2023 | ............. | B62D 21/12 |

OTHER PUBLICATIONS

Nguyen, WO-2023167896-A1, Machine Translation of Specification (Year: 2023).*

European Search Report for European Patent Application No. 23208629.8, completed May 6, 2024, 2 pages.

* cited by examiner

CROSS MEMBER, CHASSIS FRAME, VEHICLE, ASSEMBLING, AND DISASSEMBLING METHODS ASSOCIATED

PRIORITY APPLICATIONS

The present application claims priority to European Patent Application No. 23208629.8, filed on Nov. 8, 2023, and entitled "CROSS MEMBER, CHASSIS FRAME, VEHICLE, ASSEMBLING, AND DISASSEMBLING METHODS ASSOCIATED," which is incorporated herein by reference in its entirety.

TECHNICAL FIELD

The disclosure relates generally to chassis frames of vehicles. In particular aspects, the disclosure relates to a cross member, a chassis frame, a vehicle and assembling and disassembling methods associated. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Chassis frames, in particular the cross members of such chassis frames, are subjected to strong forces, due to the fact that most of the elements comprising a vehicle such as a truck are secured to the cross members. As a result, cross members may break and need to be replaced. Current cross members comprise a center piece that comes in one part, making the disassembly and assembly of the new cross member of the chassis frame difficult and time consuming. Indeed, in order to be disassembled from the rest of the chassis frame, the center piece has to be cut in two. The center piece of the replacement cross member also needs to be cut in two, mounted on side rails of the chassis frame and then welded back together. The welding operation is time consuming and needs specific protection and care. In addition to this, due to the cutting and welding operations, the replacement cross member is often weaker than the cross member it replaces. An aim of the invention is to solve these problems and provide cross members that are easier to use, in particular to assemble and disassemble.

SUMMARY

According to a first aspect of the disclosure, the invention relates to a cross member for a chassis frame of a vehicle, extending along a transversal axis, the cross member comprising a center piece comprising a first part and a second part, the first part comprising:
a first top flange, essentially planar, extending along the transversal axis;
a first bottom flange, parallel to the first top flange;
a first web, connecting the first top flange to the first bottom flange; and
a first end surface;
the second part comprising:
a second top flange, extending along the transversal axis, aligned with the first top flange along the transversal axis;
a second bottom flange, parallel to the second top flange, and aligned with the first bottom flange along the transversal axis;
a second web, connecting the second top flange to the second bottom flange and aligned with the first web along the transversal axis; and
a second end surface, aligned with the first end surface along the transversal axis, the first and second end surfaces being parallel to each other,
wherein a portion of the first end surface, when in projection in a plane parallel to the first top flange is oblique in relation to a plane perpendicular to the transversal axis,
the cross member further comprising a reinforcement member in contact with the first and second webs and secured to the first and second webs.

The first aspect of the disclosure may seek to improve a strength of the cross member, and to facilitate its replacement on a chassis frame. A technical benefit may include providing a cross member that is easier and safer to assemble and disassemble, and able to withstand important forces applied to it. Indeed, the cross member does not need to be cut in two and then welded back together. Thus, the invention means that a time-consuming and complex operation is not necessary anymore. In addition to this, the cross member according to the invention has a greater strength than cross members known in the art as a shape of the first end surface allows the cross member to withstand greater bending and torsional forces. The reinforcement member further participates in increasing the strength of the cross member Optionally in some examples, including in at least one preferred example, the portion of the first end surface is curved in projection in the plane parallel to the first top flange. A technical benefit may include optimizing the strength of the cross member.

Optionally in some examples, including in at least one preferred example, the portion of the first end surface is a first portion and the first end surface comprises an additional portion curved in projection in a plane parallel to the first web. A technical benefit may include further optimizing the strength of the cross member.

Optionally in some examples, including in at least one preferred example, the first part is integrally formed, and the second part is integrally formed. A technical benefit may include making a fabrication of the cross member easier.

Optionally in some examples, including in at least one preferred example, a distance measured along the transversal axis between the first end surface and the second end surface is equal or inferior to 5 mm. A technical benefit may include increasing the strength of the cross member.

Optionally in some examples, including in at least one preferred example, the first end surface and the second end surface are in contact with each other along the transversal axis. A technical benefit may include increasing the strength of the cross member.

Optionally in some examples, including in at least one preferred example, the reinforcement member is further in contact with and secured to the first and second top flanges and the first and second bottom flanges. A technical benefit may include may include increasing the strength of the cross member.

Optionally in some examples, including in at least one preferred example, the reinforcement member further comprises a hemi-cylindrical portion, located between the first and second top flanges and the first and second bottom flanges along a height axis. A technical benefit may include reducing air drag of the cross member.

Optionally in some examples, including in at least one preferred example, the reinforcement member is a first reinforcement member, and wherein the cross member further comprises a second reinforcement member, the second reinforcement member being in contact with and secured to the first and second webs, the webs being interposed between the first and second reinforcement members along a longitudinal axis. A technical benefit may include increasing the strength of the cross member.

Optionally in some examples, including in at least one preferred example, wherein the cross member comprises airflow disrupters provided on at least one among the first and second top and bottom flanges. A technical benefit may include reducing air drag of the cross member by creating a turbulent boundary layer around the cross member.

Optionally in some examples, including in at least one preferred example, wherein the airflow disrupters are located on the first and second top and on the first and second bottom flanges. A technical benefit may include reducing air drag of the cross member.

Optionally in some examples, including in at least one preferred example, wherein the first and second top and bottom flanges are located between the airflow disrupters. A technical benefit may include increasing the reduction of air drag of the cross member.

Optionally in some examples, including in at least one preferred example, wherein the airflow disrupters are dimples. A technical benefit may include using a shape of airflow disrupters that optimize the reduction of air drag of the cross member.

According to a second aspect of the disclosure, the invention further relates to a chassis frame, for a vehicle, the chassis frame comprising:
a first side rail;
a second side rail, parallel to the first side rail; and
the cross member of claim 1, wherein the cross member connects the first side rail to the second side rail.

The second aspect of the disclosure may seek to improve a chassis frame. A technical benefit may include providing a chassis frame with a cross member that is easier and safer to assemble and disassemble, and able to withstand important forces applied to it.

Optionally in some examples, including in at least one preferred example, the cross member comprises a first and a second top tie plate and a first and a second bottom tie plate, the first and second top tie plates being secured respectively to the first top flange and the second top flange, the first and second bottom tie plates being secured respectively to the first bottom flange and the second bottom flange, the first top and bottom tie plates being secured to the first side rail and the second top and bottom tie plates being secured to the second side rail. A technical benefit may include securing the cross member to the side rails easier.

According to a third aspect of the disclosure, the invention further relates to a vehicle comprises the chassis frame of claim 1. The third aspect of the disclosure may seek to provide a vehicle with a stronger and easier to service chassis frame. A technical benefit may include a cross member that is easier and safer to assemble and disassemble, and able to withstand important forces applied to it.

Optionally in some examples, including in at least one preferred example, the vehicle is a truck and comprises a cabin secured to the cross member. A technical benefit may include having a vehicle with a cabin that is easy to assemble and secure.

According to a fourth aspect of the disclosure, the invention further relates to a method for assembling a chassis frame of a vehicle, the chassis frame comprising:
a first side rail;
a second side rail, parallel to the first side rail; and
the cross member of claim 1, wherein the cross member connects the first side rail to the second side rail,
the method comprising:
connecting the first part to the first side rail;
positioning the second part so that the second top flange is aligned with the first top flange along the transverse axis and the first and second end surfaces are parallel to each other;
connecting the second part to the second side rail; and
positioning the reinforcement member in contact with the first and second webs and securing the reinforcement member to the first and second webs.

The fourth aspect of the disclosure may seek to provide a chassis frame that is easy to service and strong. A technical benefit may include providing a method to quickly and easily assemble the chassis frame, the chassis frame being stronger than previously known chassis frames.

Optionally in some examples, including in at least one preferred example, the method further comprises:
positioning the second reinforcement member in contact with the first and second webs so that the first and second webs are interposed between the first and second reinforcement members and securing the second reinforcement member to the first and second webs.

A technical benefit may include increasing the strength of the cross member.

According to a fifth aspect of the disclosure, the invention further relates to method for disassembling a chassis frame of a vehicle, the chassis frame comprising:
a first side rail;
a second side rail, parallel to the first side rail; and
the cross member of claim 1, wherein the cross member connects the first side rail to the second side rail,
the method comprising:
disconnecting the reinforcing member from the first and second webs; and disconnecting the second part from the second side rail.

The fifth aspect of the disclosure may seek to provide a chassis frame that is easy to service and strong. A technical benefit may include providing a method to quickly and easily disassemble the chassis frame, the chassis frame being stronger than previously known chassis frames.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
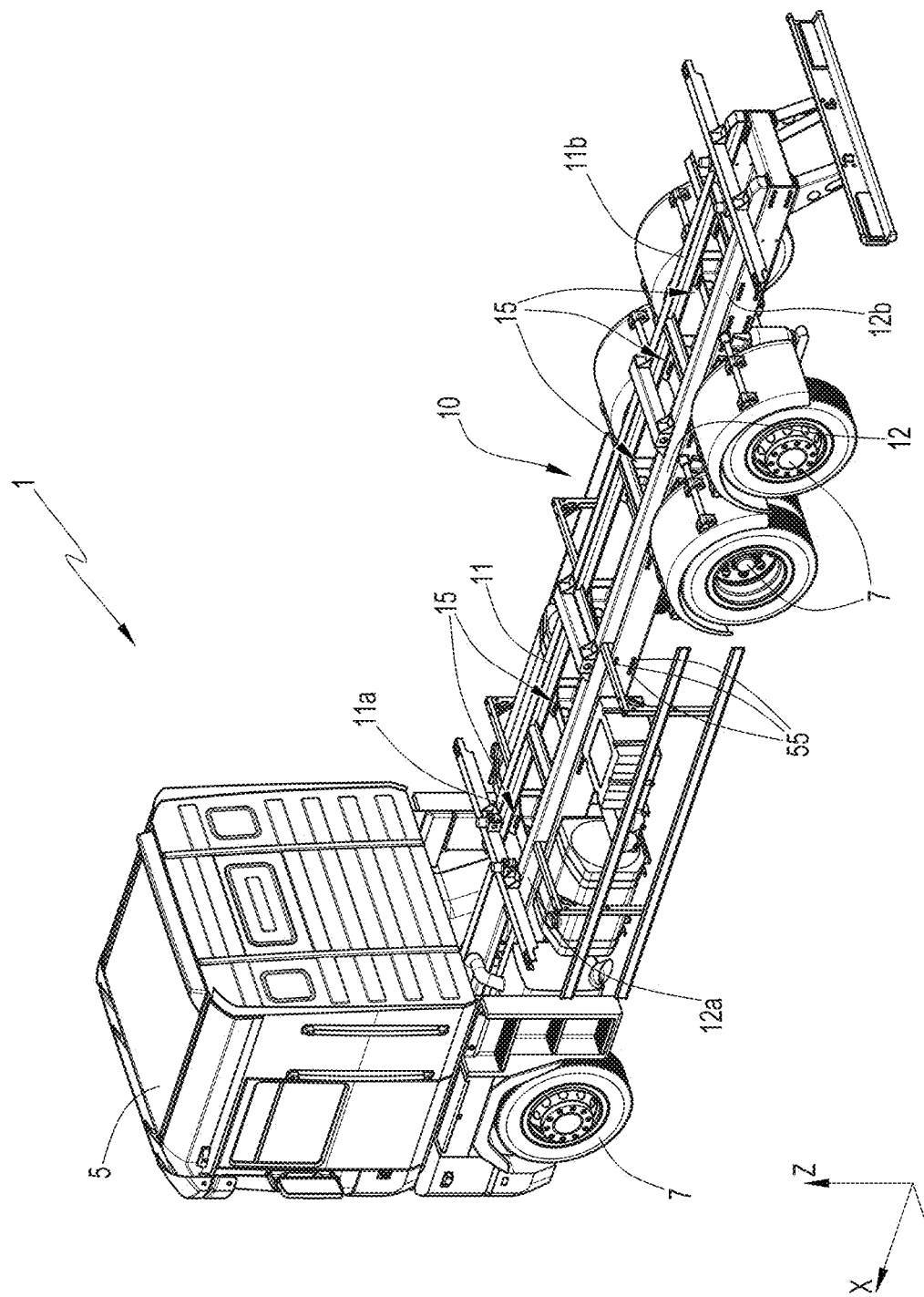
FIG. 1 is an exemplary vehicle according to an example.

FIG. 1 is an exemplary vehicle 1 according to an example. In FIG. 1, the vehicle 1 is a truck. The truck 1 comprises a cabin 5, wheels 7, a drivetrain, not represented, and a chassis frame 10. The chassis frame 10 comprises two side rails, a first side rail 11 and a second side rail 12, and at least one, generally a plurality of cross members 15.

The first side rail 11 extends along a longitudinal axis X, and the second side rail 12 is parallel to the first side rail 11.

Each cross member 15 extends along a transversal axis Y, perpendicular to the longitudinal axis X, and connects the first side rail 11 to the second side rail 12. The cabin 5, the wheels 7 and the drivetrain are all secured to the cross members 15.

The following description is made for one cross member 15, but may be applied to each cross member 15 of the chassis frame 10.

Figure 2:
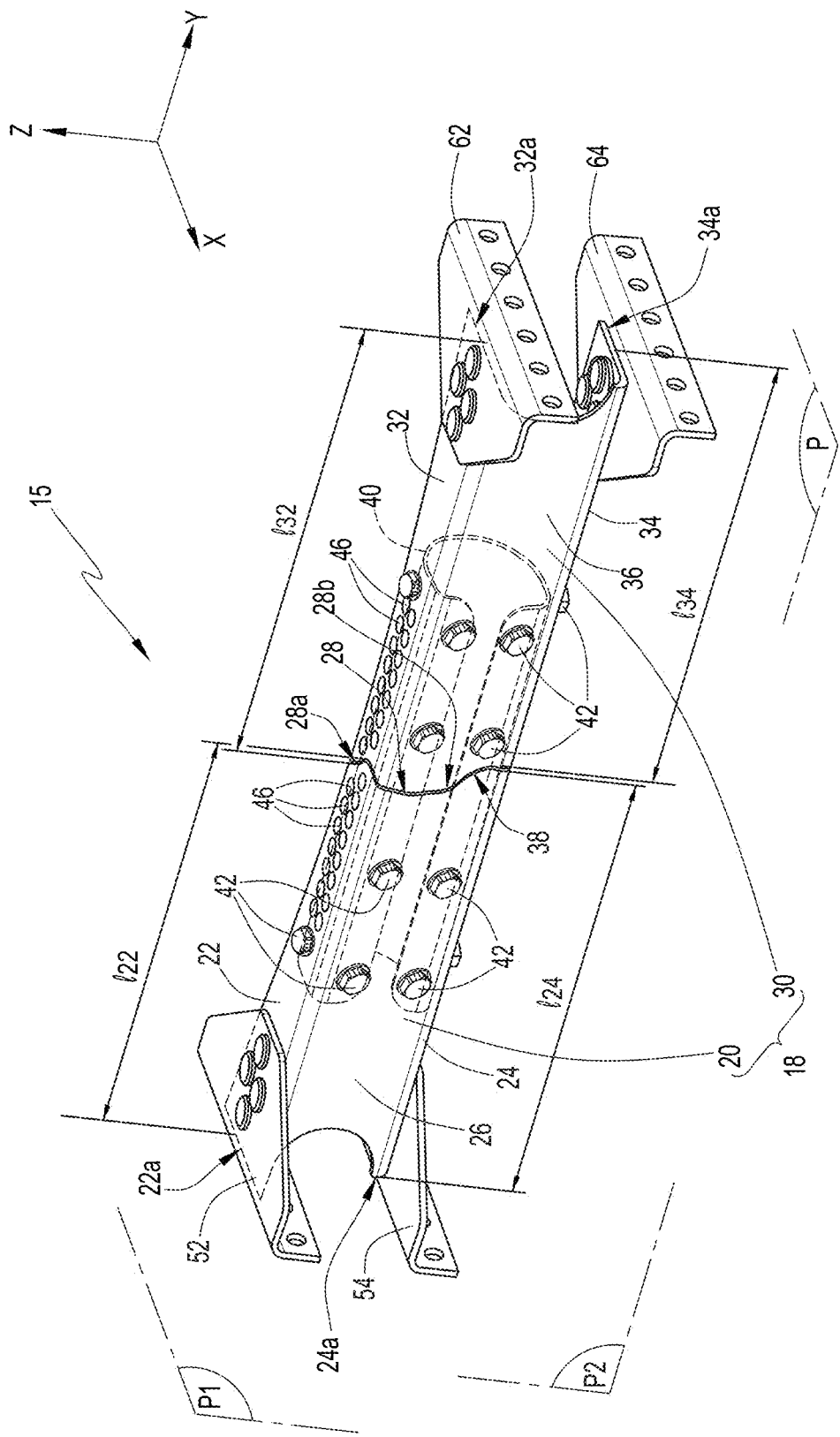
FIG. 2 is a perspective view of a cross member according to an example.

The cross member 15 comprises a center piece 18, visible on FIG. 2. The center piece 18 extends along the transversal axis Y, and comprises a first part 20 and a second part 30. The first part 20 and the second part 30 are arranged one after the other along the transversal axis Y.

The first part 20 comprises a first top flange 22, a first bottom flange 24, a first web 26 and a first end surface 28.

The first top flange 22 is essentially planar and extends along the transversal axis Y. The first bottom flange 24 is parallel to the first top flange 22. The first top flange 22 and the first bottom flange 24 are connected to each other by the first web 26. The first web 26 is also essentially planar and advantageously extends perpendicularly from the first top and bottom flanges 22 and 24. Advantageously, as visible in FIG. 2, the first top and bottom flanges 22 and 24 and the first web 26 are integrally formed with each other.

The first end surface 28 borders the first top and bottom flanges 22 and 24, and the first web 26 at one end 20a of the first center part 20. The first end surface 28 is irregular, in that a portion 28a of the first end surface 28, when in projection in a plane P parallel to the first top flange 22, is oblique in relation to a plane P1 perpendicular to the transversal axis Y.

In the example of FIG. 2, the first end surface 28 is curved, so that the portion 28a in projection in plane P is curved. Advantageously, and as represented in FIG. 2, the first end surface 28 comprises an additional portion 28b that is curved in projection on a plane P2 parallel to the first web 26. Alternatively, the projection of the first end surface 28 may form a broken line, with at least the portion 28a of the broken line being oblique in relation to the plane P1. In some examples, the portion 28a or the portion 28b in projection in plane P is perpendicular to the plane P1. Here, oblique is understood as including perpendicular.

The first top flange 22 has a maximal length 122 measured along the transversal axis Y, and the first bottom flange 24 has a maximal length 124 measured along the transversal axis Y. The maximal length 122 is measured between an end 22a of the first top flange 22 and a point of the first top flange 22 that is furthest from the end 22a along the transversal axis Y. Similarly, the maximal length 124 is measured between an end 24a of the first bottom flange 24 and a point of the first bottom flange 24 that is furthest from the end 24a along the transversal axis Y. Advantageously, one of the maximal lengths 122 or 124 is superior to the other. This improves a strength of the first part 20, compared to a first part 20 wherein the maximal lengths 122 and 124 are identical.

The second part 30 comprises, similarly to the first part 20, a second top flange 32, a second bottom flange 34 and a second web 26. The second top flange 32 is essentially planar, extends along the transversal axis Y and is aligned with the first top flange along the transversal axis Y when the cross member 15 is in use, especially when the chassis frame 10 is assembled. The second bottom flange 34 is parallel to the second top flange 32 and is aligned with the first bottom flange 24 along the transversal axis Y when the cross member 15 is in use, especially when the chassis frame 10 is assembled. The second web 36 connects the second top and bottom flange 32 and 34, is essentially planar and advantageously extends perpendicularly from the second top and bottom flanges 32 and 34. Advantageously, as visible in FIG. 2, the second top and bottom flanges 32 and 34 and the second web 36 are integrally formed with each other.

Advantageously, the second top flange 22 has a maximal length 132 and the second bottom flange 34 has a maximal length 134. The maximal length 132 is measured between an end 32a of the second top flange 22 and a point of the second top flange 32 that is furthest from the end 32a along the transversal axis Y. Similarly, the maximal length 134 is measured between an end 34a of the second bottom flange 34 and a point of the second bottom flange 34 that is furthest from the end 34a along the transversal axis Y. Advantageously, one of the maximal lengths 132 or 134 is superior to the other.

The second part 30 further comprises a second end surface 38. When the cross member 15 is in use, especially when the chassis frame 10 is assembled, the second end surface 38 is parallel to the first end surface 28 and aligned with the first end surface 28 along the transversal axis Y.

In some examples, the cross member 15 is in use, especially when the chassis frame 10 is assembled, the first and second end surfaces 28 and 38 are in contact with each other along the transversal axis Y, in which case a strength of the cross member 15 is maximal. In variant, the first and second end surfaces 28 and 38 are separated by a distance 18 which is equal to or smaller than 5 mm, to limit a weakening of the cross member 15.

Figure 3:
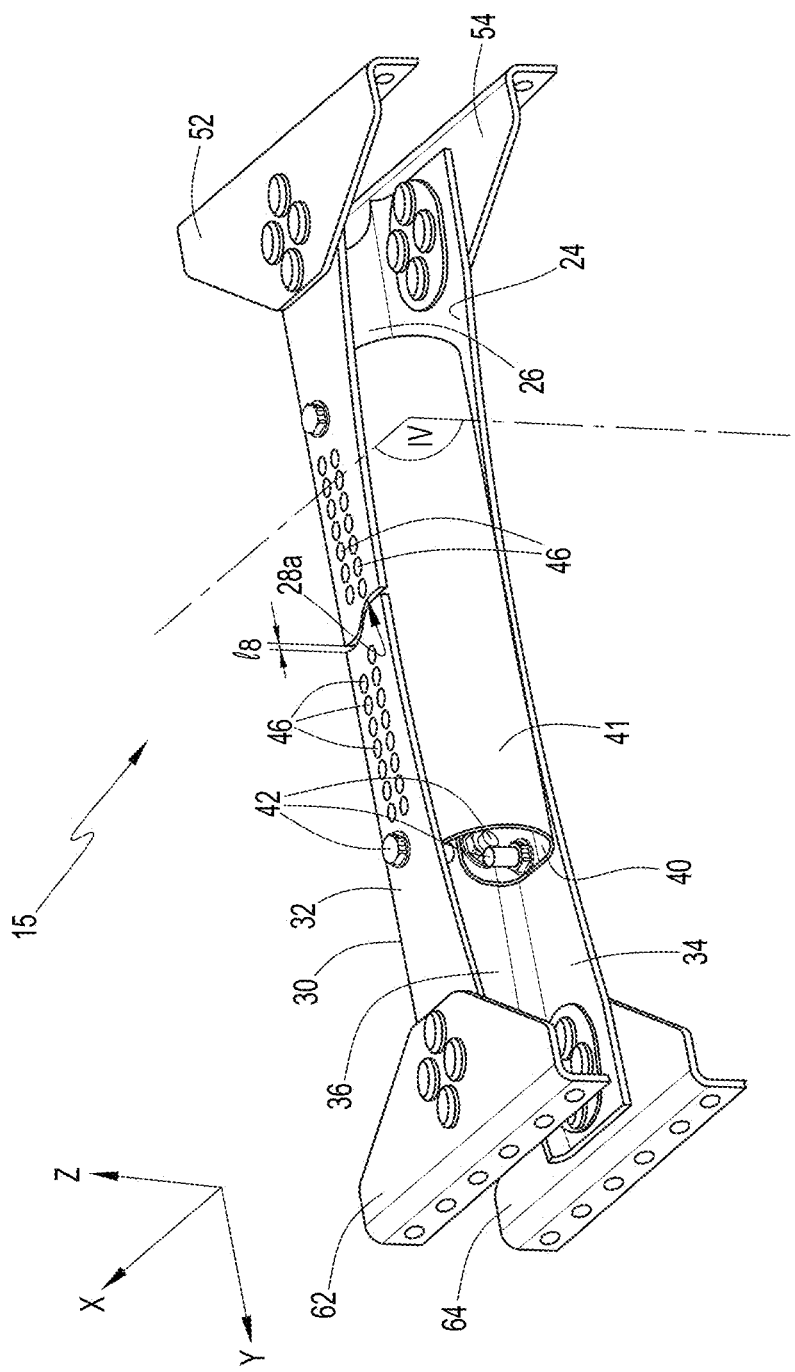
FIG. 3 is a perspective view of the cross member of FIG. 2.
Figure 4:
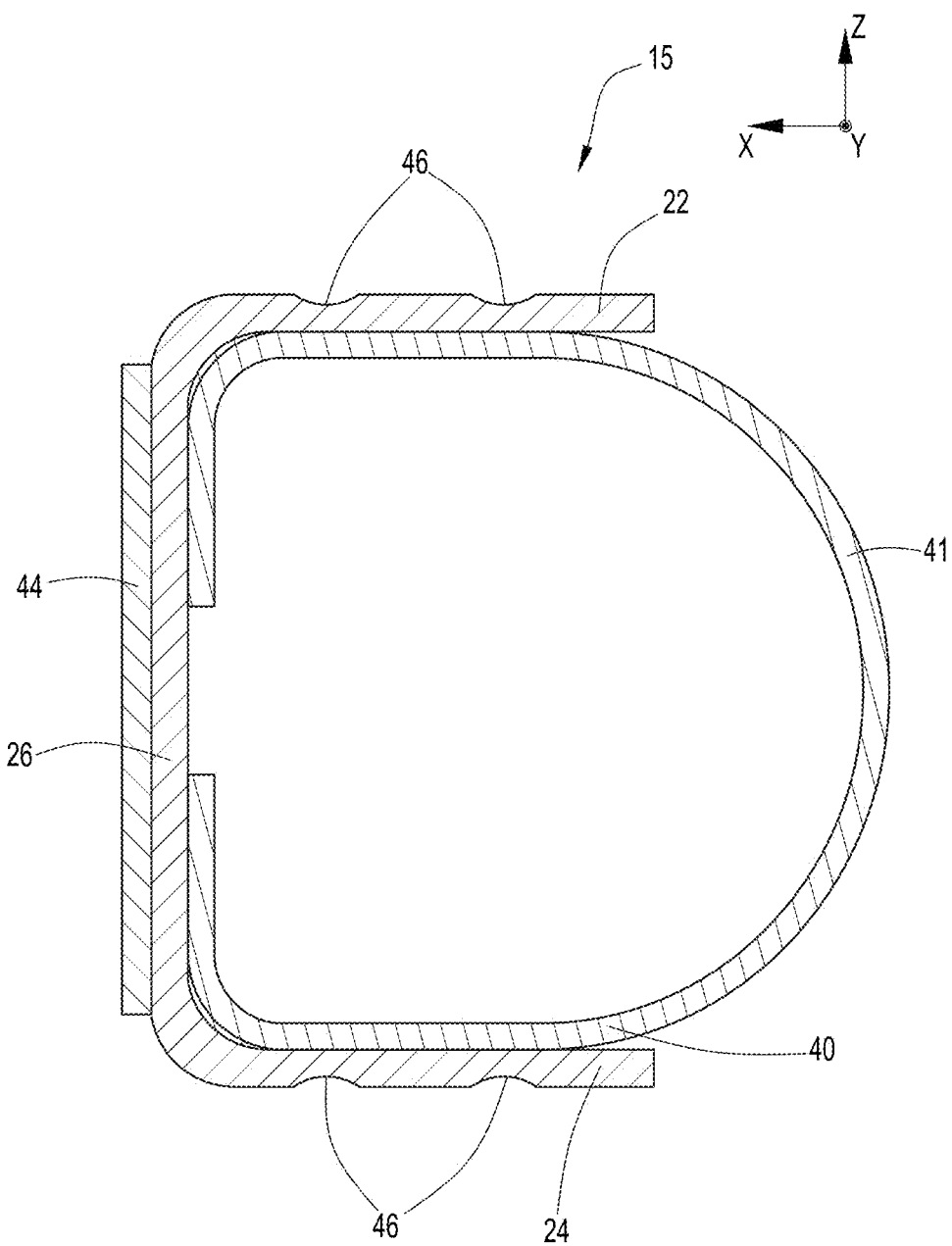
FIG. 4 is a view of a section of the cross member of FIG. 2 in the plane IV.

The cross member 15 comprises a first reinforcement member 40, to secure the first and second parts 20 and 30 to each other when the chassis frame 10 is assembled. The first reinforcement member 40 is visible on FIGS. 2 to 4. The first reinforcement member 40 extends along the transversal axis Y. The first reinforcement member 40 is located between the top flanges 22 and 32 and the bottom flanges 24 and 34, and is in contact with the first and second webs 26 and 36, and the first and second top and bottom flanges 22, 32, 24 and 34. The first reinforcement member 40 is secured to the first and second webs 26 and 36, and in the example of FIGS. 2 to 4, also secured to the first and second top and bottom flanges 22, 32, 24 and 34 by bolts 42. In the example of FIGS. 2 to 4, the first reinforcement member 40 comprises a hemi-cylindrical portion 41, located between the top flanges 22 and 32 and the bottom flanges 24 and 34, and extends away from the first and second webs 26 and 36 along the longitudinal axis X.

Advantageously, the cross member 15 further comprises a second reinforcement member 44, visible on FIG. 4. The second reinforcement member 44 is essentially planar, extends along the transversal axis Y, and is secured to the first and second webs 26 and 36, so that the first and second webs 26 and 36 are interposed between the first and the second reinforcement member 40 and 44 along the longitudinal axis X. The reinforcement members 40 and 44 increase the strength of the cross member 15, in particular increase section modulus and polar moment of inertia of the cross member 15.

In variant, not represented, the cross member 15 comprises only one reinforcement member, which may be the first reinforcement member 40 or the second reinforcement member 44.

Advantageously, the cross member 15 comprises at least one airflow disrupter 46. The airflow disrupter 46 is located on at least one of the top and bottom flanges 22, 24, 32 or 34. In FIGS. 2 to 4, the cross member 15 comprises a plurality of airflow disrupters 46, provided on all the top and bottom flanges 22, 24, 32 and 34, so that the top and bottom flanges are located between the airflow disrupters 46 along a height axis Z, perpendicular to both longitudinal and transversal axes X and Y. The airflow disrupters 46 may be bumps, ridges or grooves in the flanges 22, 24, 32 and 34. In FIGS. 2 to 4, the airflow disrupters 46 are dimples, which are circular depressions in the flanges 22, 24, 32 and 34.

The airflow disrupters 46 are configured to reduce drag of the cross member 15, by creating a turbulent boundary layer around the cross member 15 when the truck 1 is moving. The hemi-cylindrical portion 41 of the first reinforcement member 40 is also configured to reduce drag by creating a smooth surface on which the air flows.

The cross member 15 may further comprises tie plates, more precisely a first top, a first bottom, a second top and a second bottom tie plate 52, 54, 62 and 64. The first top tie plate 52 is secured to the first top flange 22, the second top tie plate 62 is secured to the second top flange 32, the first bottom tie plate 54 is secured to the first bottom flange 24, and the second bottom tie plate 54 is secured to the second bottom flange 34, for example by screws, bolts or rivets. When the chassis frame 10 is assembled, the tie plates 52, 54, 62 and 64 are also secured to the side rails 11 and 12, in order to fix the cross member 15 to the side rails 11 and 12. More specifically, the first top and bottom tie plates 52, 54 are secured to the first side rail 11, and the second top and bottom tie plates 62 and 64 are secured to the second side rail 12, for example are fastened by bolts 55.

As mentioned previously, the chassis frame 10 generally comprises multiple cross members 15. Advantageously, the cross members 15 connecting ends 11*a*, 12*a*, 11*b* and 12*b* of the side rails 11 and 12 along the transversal axis Y comprise airflow disrupters 46, as they are the cross members 15 which have the most impact on drag of the chassis frame 10. The other cross members 15 optionally comprise airflow disrupters 46.

Figure 5:
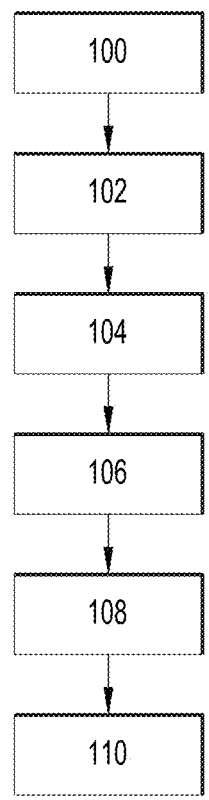
FIG. 5 is a method of assembly of a cross member according to an example.

A method for assembling the chassis frame 10 is now described in reference to FIG. 5.

A step 100 consists in aligning the first side rail 11 and the second side rail 12 along the transversal axis Y.

A step 102 consists in connecting the first part 20 of one of the cross member 15 to the first side rail 11, by securing the first top tie plate 52 and the first bottom tie plate 54 to the first side rail 11, for example by fastening the bolts 55.

A step 104 consists in positioning the second part 30 to align it with the first part 20, so that the second top flange 32 is aligned with the first top flange 22 along the transverse axis Y and the first and second end surfaces 28 and 38 are aligned along the transverse axis Y and parallel to each other.

In some examples, the first and second end surfaces 28 and 38 are brought in contact with each other at step 104.

A step 106 consists in connecting the second part 30 to the second side rail 12, by securing the second top tie plate 62 and the second bottom tie plate 64 to the second side rail 12, for example by fastening the bolts 55.

Step 108 consists in positioning the first reinforcement member 40 so that it is in contact with the first and the second webs 26 and 36, between the first and second top and bottom flanges 22, 32, 24 and 34 and then securing the first reinforcement member 40 to the first and second webs 26 and 36. In some examples, the first reinforcement member 40 is also brought in contact with the first and second top and bottom flanges 22, 32, 24 and 34 and secured to them at step 108.

Advantageously, the method for assembling the chassis frame 10 further comprises additional step 110.

Step 110 consists in positioning the second reinforcement member 44 in contact with the first and the second webs 26 and 36 so that the first and second webs 26 and 36 are between the first and the second reinforcement members 40 and 44 along the longitudinal axis X, and securing the second reinforcement member 44 to the first and second webs 26 and 36, for example by using bolts 55.

Figure 6:
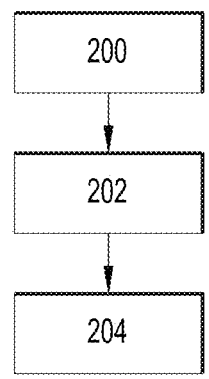
FIG. 6 is a method of disassembly of a cross member according to an example.

While the truck 1 is in service, it is possible that one of the cross members 15 is damaged. In this case, to replace the damaged cross member 15, it is necessary to disassemble the chassis frame 10. A method for disassembling the chassis frame 10 is described below, in reference to FIG. 6.

A step 200 consists in disconnecting the first reinforcing member 40 from the center piece 18, for example by unfastening the bolts 42.

Optionally, the method comprises step 202 of disconnecting the second reinforcing member 44 from the first and second top and bottom flanges 22, 32, 24 and 34.

A step 204 consists in disconnecting the second part 30 from the second side rail 12, for example by unfastening the bolts 55.

An additional step, not represented, of disconnecting the first part 20 from the first side rail 11 is optionally performed, for example, if both parts 20 and 30 are damaged and need to be replaced.

Figure 7:
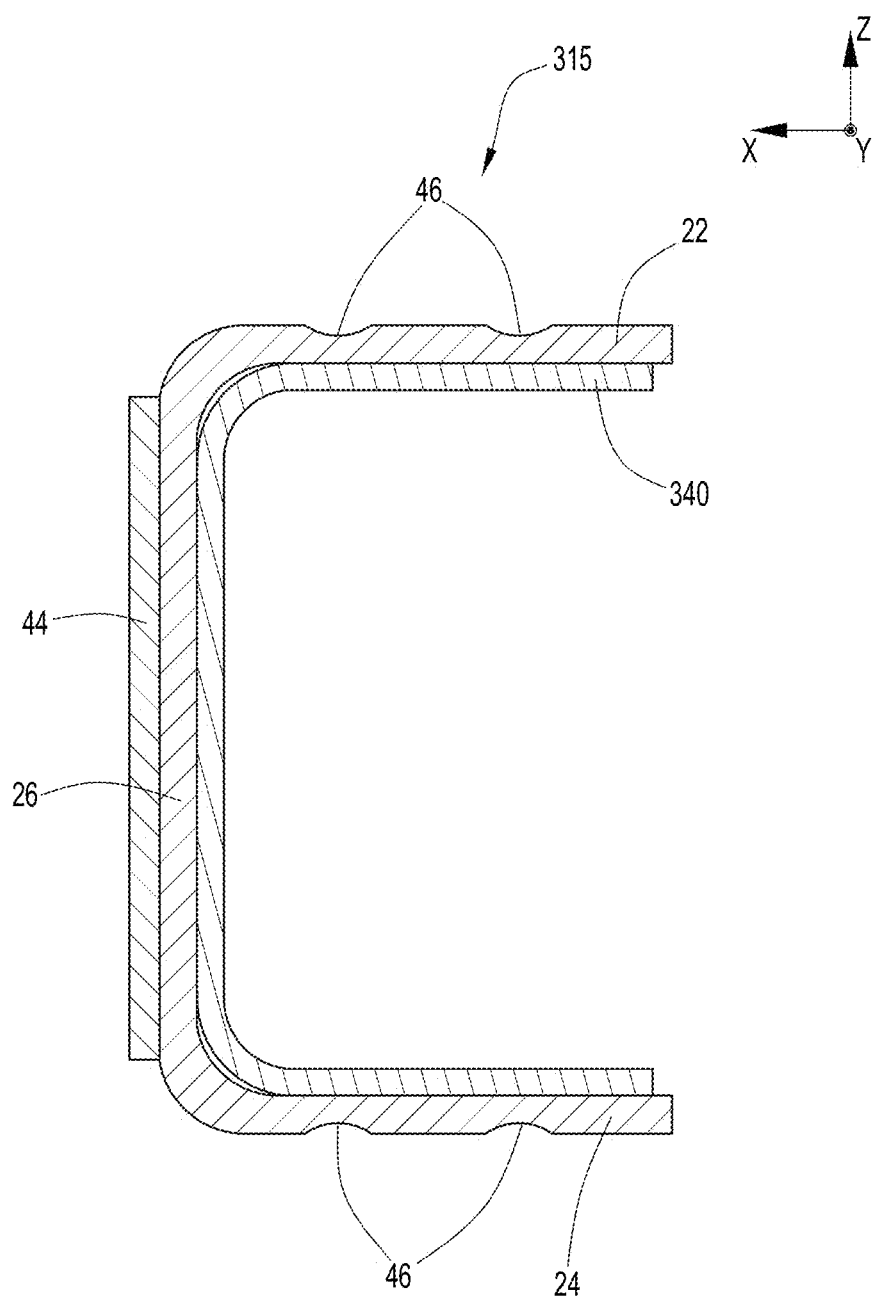
FIG. 7 is a section of a cross member according to another example.

FIG. 7 shows a section of a cross member 315 according to an alternative example of the invention. The cross member 315 is identical to the cross member 15 except for the differences described below.

The cross member 315 comprises a first reinforcement member 340 which replaces the first reinforcement member 40. The first reinforcement member 340 is located between the first and second top flanges 22, 32 and the first and second bottom flanges 24, 34 and is in contact with the flanges 22, 32, 24 and 34, as well as the first and second webs 26, 36. The first and second webs 26, 36 are interposed between the first and second reinforcement members 340 and 44. The first reinforcement member 340 is in this example, U shaped instead of comprising a hemi-cylindrical portion.

Example 1: A cross member 15; 315 for a chassis frame 10 of a vehicle 1, extending along a transversal axis Y, the cross member 15 comprising a center piece 18 comprising a first part 20 and a second part 30, the first part 20 comprising:

a first top flange 22, essentially planar, extending along the transversal axis Y;

a first bottom flange 24, parallel to the first top flange 22;

a first web 26, connecting the first top flange 22 to the first bottom flange 24; and a first end surface 28;

the second part 30 comprising:

a second top flange 32, extending along the transversal axis Y, aligned with the first top flange (22 along the transversal axis Y;

a second bottom flange 34, parallel to the second top flange 32, and aligned with the first bottom flange 24 along the transversal axis Y;

a second web 36, connecting the second top flange 32 to the second bottom flange 34 and aligned with the first web 36 along the transversal axis Y; and a second end surface 38, aligned with the first end surface 28 along the transversal axis Y, the first and second end surfaces 28, 38 being parallel to each other, wherein a portion of the first end surface 28a, when in projection in a plane P parallel to the first top flange 22 is oblique in relation to a plane P1 perpendicular to the transversal axis Y, the cross member 15; 315 further comprising a reinforcement member 40; 44; 340, in contact with the first and second webs 26, 36 and secured to the first and second webs 26, 36.

Example 2: The cross member of example 1, further comprising the portion 28a of the first end surface 28 curved in projection in the plane P parallel to the first top flange 22.

Example 3: The cross member of any of examples 1 to 2, further comprising an additional portion 28b curved in projection in a plane P2 parallel to the first web 26.

Example 4: The cross member of any of examples 1 to 3, further comprising the first part 20 integrally formed, and the second part 30 integrally formed.

Example 5: The cross member of any of examples 1 to 4, further comprising a distance 18 measured along the transversal axis Y between the first end surface 28 and the second end surface 38 equal or inferior to 5 mm.

Example 6: The cross member of any of examples 1 to 5, further comprising the first end surface 28 and the second end surface 38 in contact with each other along the transversal axis Y.

Example 7: The cross member of any of claims 1 to 6, further comprising a reinforcement member 40; 340 further in contact with and secured to the first and second top flanges 22, 32 and the first and second bottom flanges 24, 34.

Example 8: The cross member 15 of claim 7, further comprising a reinforcement member 40 further comprises a hemi-cylindrical portion 41, located between the first and second top flanges 22, 32 and the first and second bottom flanges 24, 34 along a height axis Z.

Example 9: The cross member 15 of any of claims 1 to 8, further comprising the reinforcement member 40; 340 which is a first reinforcement member 40; 340, and the cross member 15; 315 further comprises a second reinforcement member 44, the second reinforcement member 44 being in contact with and secured to the first and second webs 26, 36, the webs 26, 36 being interposed between the first and second reinforcement members 40, 44; 340 along a longitudinal axis X.

Example 10: The cross member 15; 315 of any of claims 1 to 9, further comprising the cross member 15; 315 which comprises airflow disrupters 46 provided on at least one among the first and second top and bottom flanges 22, 32, 24, 34.

Example 11: The cross member 15; 315 of claim 10, further comprising the airflow disrupters 46 located on the first and second top 22, 32 and on the first and second bottom flanges 24, 34.

Example 12: The cross member 15; 315 of claim 11, further comprising the first and second top 22, 32 and bottom flanges 24, 34 located between the airflow disrupters 46.

Example 13: The cross member 15; 315 of any of claims 9 to 12, further comprising the airflow disrupters which are dimples.

Example 14: A chassis frame 10, for a vehicle 1, the chassis frame 10 comprising:
a first side rail 11;
a second side rail 12, parallel to the first side rail; and
the cross member 15; 315 of any of claims 1 to 13, wherein the cross member 15; 315 connects the first side rail 11 to the second side rail 12.

Example 15: The chassis frame 10 of claim 14, further comprising the cross member 15; 315 which comprises a first and a second top tie plate 52, 62 and a first and a second bottom tie plate 54, 64, the first and second top tie plates 52, 62 being secured respectively to the first top flange 22 and the second top flange 32, the first and second bottom tie plates 54, 64 being secured respectively to the first bottom flange 24 and the second bottom flange 34, the first top and bottom tie plates 52, 54 being secured to the first side rail 11 and the second top and bottom tie plates 62, 64 being secured to the second side rail 12.

Example 16: A vehicle 1 further comprising the chassis frame 10 of any of claims 14 to 15.

Example 17: The vehicle 1 of claim 16, further comprising the vehicle 1 which is a truck and comprises a cabin 5 secured to the cross member 15; 315.

Example 18: A method for assembling a chassis frame 10 of a vehicle 1, the chassis frame (10) comprising:
a first side rail 11;
a second side rail 12, parallel to the first side rail; and
the cross member 15; 315 of any of claims 1 to 13, wherein the cross member 15; 315 connects the first side rail 11 to the second side rail 12,
the method comprising:
connecting at step 102 the first part 20 to the first side rail 11;
positioning at step 104 the second part 30 so that the second top flange 32 is aligned with the first top flange 22 along the transverse axis Y and the first and second end surfaces 28, 38 are parallel to each other;
connecting at step 106 the second part 30 to the second side rail 12; and
positioning at step 108 the reinforcement member 40; 44; 340 in contact with the first and second webs 26, 36 and securing the reinforcement member 40; 44; 340 to the first and second webs 26, 36.

Example 19: The method of claim 18, further comprising the cross member 15; 315 according to claim 9 and the method further comprising;
positioning 110 the second reinforcement member 44 in contact with the first and second webs 26, 36 so that the first and second webs 26, 36 are interposed between the first and second reinforcement members 40, 44; 340 and securing the second reinforcement member 40, 44:340 to the first and second webs 26, 36.

Example 20: A method for disassembling a chassis frame 10 of a vehicle 1 the chassis frame 10 comprising:
a first side rail 11;
a second side rail 12, parallel to the first side rail 11; and
the cross member 15; 315 of any claims 1 to 13, further comprising the cross member 15; 315 which connects the first side rail 11 to the second side rail 12,
the method comprising:

disconnecting at step 200 the reinforcing member 40 from the first and second webs 26, 36; and disconnecting at step 204 the second part 30 from the second side rail 12.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A cross member for a chassis frame of a vehicle, extending along a transversal axis, the cross member comprising a center piece comprising a first part and a second part, the first part comprising:
    a first top flange extending along the transversal axis;
    a first bottom flange, parallel to the first top flange;
    a first web, connecting the first top flange to the first bottom flange; and
    a first end surface, the first end surface bordering the first top and bottom flanges, and the first web at one end of the first part;
  the second part comprising:
    a second top flange, extending along the transversal axis, aligned with the first top flange along the transversal axis;
    a second bottom flange, parallel to the second top flange, and aligned with the first bottom flange along the transversal axis;
    a second web, connecting the second top flange to the second bottom flange and aligned with the first web along the transversal axis; and
    a second end surface, aligned with the first end surface along the transversal axis, the first and second end surfaces being parallel to each other, the first and second end surfaces facing each other along the transversal axis;
    wherein a portion of the first end surface, when in projection in a plane parallel to the first top flange, is oblique in relation to a plane perpendicular to the transversal axis;
  the cross member further comprising a reinforcement member in contact with the first and second webs and secured to the first and second webs.

2. The cross member of claim 1, wherein the portion of the first end surface is curved in projection in the plane parallel to the first top flange.

3. The cross member of claim 1, wherein the portion of the first end surface is a first portion and the first end surface comprises an additional portion curved in projection in a plane parallel to the first web.

4. The cross member of claim 1, wherein the first part is integrally formed, and wherein the second part is integrally formed.

5. The cross member of claim 1, wherein a distance measured along the transversal axis between the first end surface and the second end surface is equal or inferior to 5 mm.

6. The cross member of claim 1, wherein the first end surface and the second end surface are in contact with each other along the transversal axis.

7. The cross member of claim 1, wherein the reinforcement member is a first reinforcement member, and wherein the cross member further comprises a second reinforcement member, the second reinforcement member being in contact with and secured to the first and second webs, the webs being interposed between the first and second reinforcement members along a longitudinal axis.

8. The cross member of claim 1, wherein the cross member comprises airflow disrupters provided on at least one among the first and second top and bottom flanges.

9. The cross member of claim 8, wherein the airflow disrupters are located on the first and second top and on the first and second bottom flanges.

10. A chassis frame, for a vehicle, the chassis frame comprising:
    a first side rail;
    a second side rail, parallel to the first side rail; and
    the cross member of claim 1, wherein the cross member connects the first side rail to the second side rail.

11. The chassis frame of claim 10, wherein the cross member comprises a first and a second top tie plate and a first and a second bottom tie plate, the first and second top tie plates being secured respectively to the first top flange and the second top flange, the first and second bottom tie plates being secured respectively to the first bottom flange and the second bottom flange, the first top and bottom tie plates being secured to the first side rail and the second top and bottom tie plates being secured to the second side rail.

12. A vehicle comprising the chassis frame of claim 10.

13. A method for assembling a chassis frame of a vehicle, the chassis frame comprising:
a first side rail;
a second side rail, parallel to the first side rail; and
the cross member of claim 1, wherein the cross member connects the first side rail to the second side rail;
the method comprising:
connecting the first part to the first side rail;
positioning the second part so that the second top flange is aligned with the first top flange along the transverse axis and the first and second end surfaces are parallel to each other;
connecting the second part to the second side rail; and
positioning the reinforcement member in contact with the first and second webs and securing the reinforcement member to the first and second webs.

14. The method of claim 13, wherein airflow disrupters are located on the first and second top and on the first and second bottom flanges and the method further comprises:
positioning the second reinforcement member in contact with the first and second webs so that the first and second webs are interposed between the first and second reinforcement members and securing the second reinforcement member to the first and second webs.

15. A method for disassembling a chassis frame of a vehicle, the chassis frame comprising:
a first side rail;
a second side rail, parallel to the first side rail; and
the cross member of claim 1, wherein the cross member connects the first side rail to the second side rail;
the method comprising:
disconnecting the reinforcing member from the first and second webs; and
disconnecting the second part from the second side rail.

\* \* \* \* \*